United States Patent [19]
Abe et al.

[11] Patent Number: 4,917,866
[45] Date of Patent: * Apr. 17, 1990

[54] PRODUCTION PROCESS OF SILICON CARBIDE SHORT FIBERS

[75] Inventors: Susumu Abe; Tadayoshi Ikai, both of Toyota; Masahiro Ogawa, Toyoake, all of Japan

[73] Assignee: Toyota Jidosha Kabushiki Kaisha, Aichi, Japan

[*] Notice: The portion of the term of this patent subsequent to Jan. 12, 2005 has been disclaimed.

[21] Appl. No.: 269,339

[22] Filed: Nov. 10, 1988

[30] Foreign Application Priority Data

Nov. 12, 1987 [JP] Japan .................. 62-286261

[51] Int. Cl.$^4$ .................................. C01B 31/36
[52] U.S. Cl. ................... 423/345; 423/346
[58] Field of Search ...................... 423/345, 346

[56] References Cited

U.S. PATENT DOCUMENTS

| | | | |
|---|---|---|---|
| 4,613,490 | 9/1986 | Suzuki et al. | 423/344 |
| 4,719,095 | 1/1988 | Abe et al. | 423/346 |

FOREIGN PATENT DOCUMENTS

| | | | |
|---|---|---|---|
| 0017720 | 7/1979 | Japan | 423/346 |
| 0071812 | 5/1982 | Japan | 423/345 |
| 0111300 | 7/1982 | Japan | 423/346 |
| 58-120599 | 7/1983 | Japan | . |
| 58-172297 | 10/1983 | Japan | . |
| 1097126 | 5/1986 | Japan | 423/346 |
| 61-178413 | 8/1986 | Japan | . |
| 3176303 | 7/1988 | Japan | 423/346 |

Primary Examiner—Robert L. Stoll
Assistant Examiner—Lori F. Cuomo
Attorney, Agent, or Firm—Finnegan, Henderson, Farabow, Garrett, Dunner

[57] ABSTRACT

A process for producing silicon carbide short fibers comprises oxidizing metallic silicon powder in an oxidizing gas atmosphere into silicon monoxide in the form of ultrafine particles or gas, and carbonizing said silicon monoxide in a reducing gas atmosphere containing carbon at temperatures being lower than temperatures for producing powder and falling in a temperature range for causing a heterogenous core formation of silicon carbide, thereby producing silicon carbide short fibers. The process of the present invention is capable of mass-producing silicon carbide short fibers continuously in a short time.

11 Claims, 2 Drawing Sheets

PRODUCTION PROCESS OF SILICON CARBIDE SHORT FIBERS

BACKGROUND OF THE INVENTION

1. Field of the Invention

This invention relates to a production process of silicon carbide short fibers, and more particularly to a production process of silicon carbide short fibers performed continuously and capable of mass producing silicon carbide short fibers in a short period of time.

2. Discussion of the Background

As for conventional production processes of silicon carbide whiskers, the following processes have been known:

Japanese Unexamined Patent Publication No. 120599/1983 discloses a production process of silicon carbide whiskers: A raw material "A" comprising a mixture of fine powder of silicate compound and carbon, and a raw material "B" comprising fine powder of carbon are prepared in a predetermined mole ratio and disposed adjacent to each other. In the raw material "A", the silicate compound and carbon are so mixed that the ratio of silicon dioxide ($SiO_2$) to carbon (C) is set to a predetermined ratio. Then, both of the raw materials "A" and "B" are heated at temperatures of 1300° to 1600° C. in a non-oxidizing atmosphere to produce silicon carbide whiskers in the raw material "B".

Japanese Unexamined Patent Publication No. 172297/1983 discloses another production process of silicon carbide whiskers: A silicon source raw material mainly composed of silicon dioxide ($SiO_2$) and furnace carbon black are heated at temperatures of 1300° to 1800° C. in a non-oxidizing atmosphere to produce silicon carbide whiskers.

Further, Japanese Unexamined Patent Publication No. 178413/1986 discloses a production process of silicon carbide powder comprising the steps of oxidizing a metallic silicon powder in an oxidizing gas atmosphere into silicon monoxide in the form of ultrafine particles or gas, and carbonizing the silicon monoxide in a reducing gas atmosphere containing carbon, thereby producing silicon carbide powder.

The above conventional production processes of silicon carbide whiskers have the following problems:

(a) A large amount of electricity is required because silicon carbide whiskers formation reaction is an endothermic reaction.

(b) Productivity of the conventional production processes is low because the silicon carbide whiskers are produced by the batch. Accordingly, the conventional production processes result in increasing production cost.

(c) The conventional processes require a long period of reaction time.

(d) Moldabilty of fiber reinforced metals is not good when the silicon carbide whiskers produced by the conventional production process are employed for fiber reinforced metals, because the silicon carbide whiskers have a large aspect ratio, i.e. ratio of length of whiskers to diameter thereof.

In addition, the third production process mentioned above is for producing silicon carbide powder, and it features to produce the silicon carbide powder by performing a homogeneous core formation at relatively high temperatures. Consequently., it is impossible to produce short fibers by this production process.

SUMMARY OF THE INVENTION

This invention has been developed to overcome the above-mentioned problems. It is therefore an object of this invention to provide a production process capable of mass-producing silicon carbide short fibers continuously and in a short period of time.

A process for producing silicon carbide short fibers comprises oxidizing metallic silicon powder in an oxidizing gas atmosphere into silicon monoxide in the form of ultrafine particles or gas, and carbonizing said silicon monoxide in a reducing gas atmosphere containing carbon at temperatures being lower than temperatures for producing silicon carbide powder and falling in a temperature range for causing a heterogenous core formation of silicon carbide, thereby producing silicon carbide short fibers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
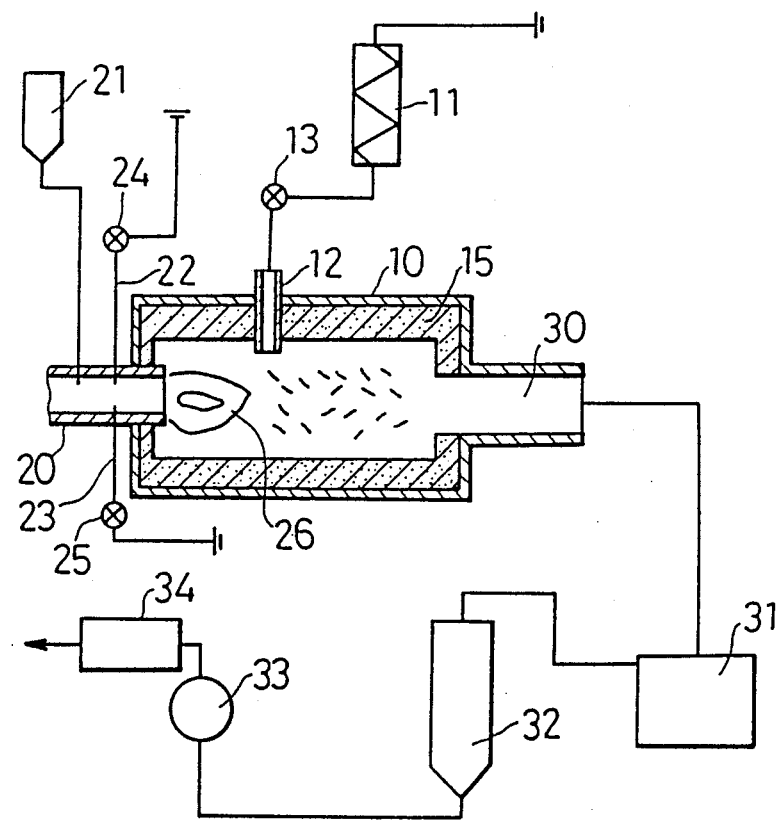
FIG. 1 is a flow sheet of the reaction of an example of the present invention.

The oxidation step in the production process of the present invention is an important feature of the present invention. In this step metallic silicon powder is oxidized in an oxidizing gas atmosphere into silicon monoxide. The powdered metallic silicon starting material is preferably of a particle size finer than 200 mesh. The production process of the present invention does not require metallic silicon powder of high purity.

Suitable examples of the oxidizing gas include air, oxygen gas and ozone gas, which oxidize metallic silicon powder into silicon monoxide. The reaction of metallic silicon powder with an oxidizing gas may be performed by different techniques. In a preferred technique, a dust cloud is formed from metallic silicon powder and an oxidizing gas, and this cloud is subsequently ignited, thereby resulting in explosive combustion of the metallic silicon powder. This combustion generates a large amount of heat which produces a high temperature and which promotes the extensive oxidation of metallic silicon powder, thereby forming silicon monoxide as an ultrafine powder or gas. In addition, the heat energy generated in the oxidation reaction may be used to supply heat for the carbonization step which follows.

A burner, plasma jet, arc discharge or laser beam can be employed to ignite the dust cloud. The density of the dust cloud may be adjusted according to the particle size of metallic silicon powder used and the ignition means employed Furthermore, powdered metallic silicon may be fed intermittently at short intervals or continuously to the reactor. Moreover, the reaction flame is preferably formed continuously for good heat efficiency.

In the carbonization step, the silicon monoxide obtained from the oxidation step is reduced and carbonized into silicon carbide short fibers. The carbonization step of the present invention features that its temperatures are lower than temperatures for producing silicon carbide powder and fall in a range of temperatures for causing a heterogenous core formation of silicon carbide. The temperature range is generally from 1300° to 1800° C. It is hard to cause the reduction at temperatures less than 1300° C., and a homogeneous core formation occurs to form powder when the temperature exceeds 1800° C. Thus, the temperature range is set 1800° C. or less in order to cause the heterogenous core formation of silicon carbide. The temperatures may be determined according to reducing gases used, supply of the reducing gases and conditions of the oxidation step.

The reducing gas used for the carbonization step may preferably be hydrocarbon gases having sufficient hydrogens for reducing the silicon monoxide and sufficient carbons for carbonizing the silicon monoxide. The hydrocarbon gases may be acetylene, methane, ethane, propane and the like. In case, the hydrocarbon gases are employed, the reduction is caused by hydrogen and carbon atoms contained therein, and subsequently carbonization is caused by the carbon. In addition, the reducing gas containing carbon may be heated beforehand.

The silicon monoxide is brought into contact with the reducing gas containing carbon at high temperatures, thereby reduced and carbonized into silicon carbide. The oxidation step and the carbonization step may preferably be performed in succession in order to utilize the heat generated by the oxidation step. In the case where the dust cloud is formed from the metallic silicon powder and the oxidizing gas, a continuous frame is formed. The continuous flame contains a large amount of silicon monoxide resulting from the metallic silicon powder and the oxidizing gas. Accordingly, the continuous flame is formed in the reducing gas atmosphere, and thereby the reduction and carbonization reactions are developed continuously by the thermal energy of the continuous flame, and silicon monoxide in the form of ultrafine particles or gas is made into silicon carbide short fibers.

The silicon carbide short fibers may be collected with a known collector such as a bag filter and so on. The gases passed through the collector should preferably be processed by burning or similar treatments to discharge to the atmosphere, because they usually contain unreacted oxidizing gas and reducing gas containing carbon.

Short fibers, not powder, can be produced by the production process of the present invention, because the carbonization is performed at relatively low temperatures for causing a heterogenous core formation.

Another aspect of the present invention is that the heat generated by the reaction of metallic silicon powder with an oxidizing gas, which is initiated by means of an ignitor such as a burner or plasma jet, promotes the reaction of the remaining metallic silicon powder. This leads to a very highly heat efficient process and low production costs. The reaction of metallic silicon powder with an oxidizing gas, forms continuously a reaction flame containing silicon monoxide in the form of ultrafine powder or gas. Upon contact with a reducing gas containing carbon, the reaction flame forms a large amount of silicon carbide short fibers continuously and in an extremely short period of time.

In addition, short fibers having a smaller aspect ratio than short fibers produced by the conventional production process can be produced by the production process of the present invention. Consequently, moldability of fib-r reinforced metal and fiber reinforced ceramic is remarkably good when the short fibers produced by the present invention production process are employed for the fiber reinforced metal and fiber reinforced ceramic.

Having generally described this invention, a further understanding can be obtained by reference to certain specific examples which are provided herein for purposes of illustration only and are not intended to be limiting unless otherwise specified. Example An apparatus employed in this example is shown in FIG. 1. It is constructed mainly of a reaction furnace (10) and a burner (20). The reaction furnace (10) is surrounded by an inner wall (15) of fire bricks and is provided with an outlet (30) which passes through one wall. The burner (20) is mounted on the furnace wall facing the outlet. For the burner (20) to produce a flame in the reaction furnace (10), it is provided with a feeder (21) for feeding metallic silicon powder, an oxygen supply tube (22), and an LPG supply tube (23). (LPG is the fuel for the pilot flame.) The upper wall of the reaction furnace (10) is provided with an inlet (12) for supplying propane gas. The propane gas is fed through preheater (11).

Beyond the outlet (30) are serially arranged a powder collector (31) and a paper filter (32) for collecting silicon carbide short fibers which have passed through the powder collector (31). The waste gas from the paper filter (32) is discharged through a combustion treating unit (34) by blower (33).

The apparatus described above was used to prepare silicon carbide short fibers as follows: At first, a valve (24 of oxygen supply tube (22) and a valve (25) of LPG supply tube (23) were opened, and the burner (20) was ignited to dry the reaction furnace (10) completely and to remove oxygen from the reaction furnace (10). Metallic silicon powder was fed continuously at a rate of approximately 2 kg/hour through the powder feeder (21). The metallic silicon powder was the one passed through 200 to 350 mesh filter. Simultaneously, oxygen was fed into the reaction furnace (10) at a rate of 1 to 2 $Nm^3$/hour (equivalent to the amount of metallic silicon powder being fed) through the oxygen supply tube (22). The oxygen gas was pressurized to 2 $kgf/cm^2$. Then, also simultaneously, propane of 5000 $mmH_2O$ pressure was introduced into the reaction furnace (10) at a rate of 0.4 $Nm^3$/hour through the LPG supply tube (23) to ignite the silicon-oxygen gas flow. Immediately after igniting the silicon-oxygen gas flow, a valve (13) of the propane gas supply tube (12) was opened to introduce the propane gas heated at approximately 400° C. with the preheater (11) and pressurized to 5000 $mmH_2O$ into a flame ignited at a rate of 2 to 3 $Nm^3$/hour to violently stir the flame ignited. At this moment, the supply of propane gas was regulated in order to maintain temperatures at which silicon monoxide (SiO) gas and silicon dioxide ($SiO_2$) gas do not cause the homogeneous core formation. The temperatures could not be determined explicitly because of the reducing atmosphere and temperature variation in the flame ignited. However, it is believed that the temperatures fall in a range of from 1300° to 1800° C. according to a thermodynamics calculation based on the fact that temperatures adjacent the walls of the furnace (10) were 1000° to 1200° C. When the temperatures are too low, no reduction and carbonization reactions occur because a mixed state of silicon dioxide (SiO$_2$) and carbon (C) occurs.

As these raw materials were continuously fed to the reaction furnace (10), a reaction flame (26) was continuously formed at the opening of the burner (20) as the result of oxidation of metallic silicon powder. Upon heating by the reaction flame (26), the silicon monoxide (SiO) in the form of ultrafine powder or gas was reduced and carbonized into silicon carbide short fibers by the propane gas. The silicon carbide short fibers were collected by the paper filter (32) at a yield of 3.2 kg/hour after passing through the powder collector (31) with the reducing gas, i.e. carbon monoxide and hydrogen gases. The waste gas which had passed through the paper filter (32) was introduced into the combustion treating unit (34) by the blower (33), and finally discharged to the atmosphere.

Figure 2:
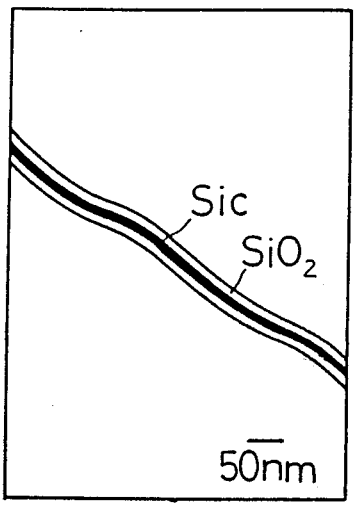
FIG. 2 is an illustration on a configuration of a short fiber produced by the reaction of the example.
Figure 3:
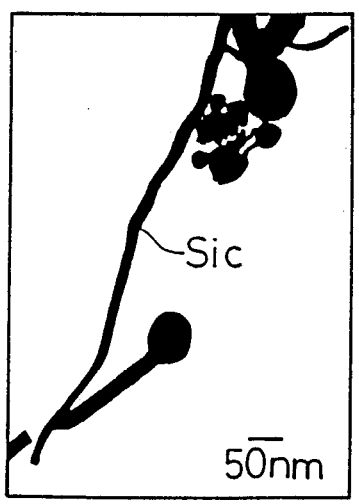
FIG. 3 is an illustration on a configuration of the short fiber after treated with hydrofluoric acid.

Transmission electron microscope observation and X-ray diffraction analysis identified the resulting silicon carbide short fibers to be fibers having beta type cubic system. FIG. 2 is an illustration of the silicon carbide short fiber traced from an image of the silicon carbide short fiber taken with a transmission electron microscope at a magnification of 100,000. In the figure, the black portion at the middle is silicon carbide, and a coating layer surrounding the silicon carbide is silicon dioxide. The short fibers had a diameter of approximately 0.05 micrometers, and a length of 2 to 3 micrometers. Namely, they had a relatively small aspect ratio of 40 to 60. FIG. 3 is an illustration of the silicon carbide short fiber, after treated with hydrofluoric acid, traced from an image of the silicon carbide short fiber taken with the transmission electron microscope. The figure shows that the silicon dioxide coating layer had dissolved and that only the beta type silicon carbide had remained and the beta type silicon carbide short fibers of high purity had been produced. The nodular shaped portions at the ends were identified as silicon (Si), so that the silicon carbide short fibers are believed to be produced by crystal growth in accordance with the Vapor-Liquid-Solid mechanism.

Thus, silicon carbide short fibers were produced continuously and in a short period of time, i.e. the reaction time of 1 second or less. As a result, the production process according to the Example had an extraordinary mass-producing capability.

Having now fully described the invention, it will be apparent to one of ordinary skill in the art that many changes and modifications can be made thereto without departing from the spirit or scope of the invention as set forth herein.

What is claimed is:
1. A process for producing silicon carbide fibers, which comprises:
 (a) oxidizing metallic silicon powder in an oxidizing gas atmosphere into silicon monoxide in the form of ultrafine particles or gas; and
 (b) carbonizing said silicon monoxide in a reducing gas atmosphere containing carbon at a temperature falling in the range of 1300° to 1800° C. for causing a heterogeneous core information of silicon carbide, thereby producing silicon carbide short fibers.
2. A process for producing silicon carbide fibers according to claim 1, wherein said carbon is contained in a hydrocarbon gas.
3. A process for producing silicon carbide fibers according to claim 2, wherein said hydrocarbon gas is at least one selected from the group consisting of acetylene gas, methane gas, ethane gas and propane gas.
4. A process for producing silicon carbide fibers according to claim 1, wherein said oxidation step is conducted by forming a dust cloud from said metallic silicon powder and an oxidizing gas, and then igniting the dust cloud to cause explosive burning of said metallic silicon powder.
5. A process for producing silicon carbide fibers according to claim 4, wherein said igniting is accomplished by means of a burner, a plasma jet, arc discharge or laser beam.
6. A process for producing silicon carbide fibers according to claim 1, wherein said metallic silicon powder has a particle size of 200 mesh or less.
7. A process for producing silicon carbide fibers according to claim 1, wherein said reducing gas is preheated prior to carbonizing said silicon monoxide.
8. A process for producing silicon carbide fibers according to claim 1, wherein said carbonizing is continuously conducted as said oxidation continuously proceeds, and heat from said oxidation step provides energy for said carbonizing step.
9. A process for producing silicon carbide fibers according to claim 1, wherein said oxidizing gas is at least one of air, oxygen gas and ozone gas.
10. A process for producing silicon carbide fibers according to claim 1, wherein the reaction time for said oxidizing and carbonizing steps does not exceed one second.
11. A process for producing silicon carbide fibers according to claim 1, wherein said fibers have a crystalline structure.

* * * * *